US007508088B2

(12) United States Patent
Kothnur et al.

(10) Patent No.: US 7,508,088 B2
(45) Date of Patent: Mar. 24, 2009

(54) SYSTEM AND METHOD FOR INSTALLING A WIND TURBINE AT AN OFFSHORE LOCATION

(75) Inventors: Vasanth Srinivasa Kothnur, Clifton Park, NY (US); David Deloyd Anderson, Glenville, NY (US); Danian Zheng, Clifton Park, NY (US); Mohamed Ahmed Ali, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 262 days.

(21) Appl. No.: 11/172,747

(22) Filed: Jun. 30, 2005

(65) Prior Publication Data

US 2007/0001464 A1 Jan. 4, 2007

(51) Int. Cl.
*H20P 9/04* (2006.01)
(52) U.S. Cl. .............................. 290/44; 290/43; 290/55; 290/54
(58) Field of Classification Search .................. 290/55, 290/44, 54, 43; 416/119, 117, 142
See application file for complete search history.

(56) References Cited

U.S. PATENT DOCUMENTS

| | | | | |
|---|---|---|---|---|
| 4,156,580 A | * | 5/1979 | Pohl | 415/4.2 |
| 4,449,053 A | * | 5/1984 | Kutcher | 290/44 |
| 4,572,962 A | * | 2/1986 | Shepard | 290/55 |
| 4,704,051 A | * | 11/1987 | Ellingvag | 405/224 |
| 4,792,700 A | * | 12/1988 | Ammons | 290/55 |
| 4,979,871 A | * | 12/1990 | Reiner | 415/4.2 |
| 5,174,724 A | * | 12/1992 | Ammons | 417/35 |
| 5,531,567 A | * | 7/1996 | Hulls | 416/87 |
| 6,782,667 B2 | * | 8/2004 | Henderson | 52/116 |
| 6,784,566 B2 | * | 8/2004 | Thomas | 290/55 |
| 7,100,438 B2 | * | 9/2006 | LeMieux | 73/170.16 |
| 7,126,235 B2 | * | 10/2006 | Bernhoff et al. | 290/44 |
| 2005/0019163 A1 | * | 1/2005 | Heronemus | 416/44 |
| 2006/0062676 A1 | * | 3/2006 | Jakubowski et al. | 416/244 R |

FOREIGN PATENT DOCUMENTS

| | | |
|---|---|---|
| DE | 19955572 | 6/2000 |
| DE | 20100474 U | 5/2001 |
| EP | 1234978 | 8/2002 |
| EP | 1270848 | 1/2003 |
| EP | 1348867 | 10/2003 |
| WO | WO 03/004870 | 1/2003 |
| WO | WO 03080939 | 10/2003 |

* cited by examiner

*Primary Examiner*—Quyen P Leung
*Assistant Examiner*—Iraj A Mohandesi
(74) *Attorney, Agent, or Firm*—Patrick K. Patnode

(57) ABSTRACT

A wind turbine system includes a wind turbine generator having a rotor and a nacelle mounted atop wind tower. The wind tower is mounted on a central caisson. The wind turbine system further includes a plurality of tensioned mooring lines flexibly secured to the central caisson. The mooring lines are further secured to a plurality of anchors fixed on to a sea bed. The anchors are adapted to support lateral loads on the wind turbine system.

17 Claims, 4 Drawing Sheets

SYSTEM AND METHOD FOR INSTALLING A WIND TURBINE AT AN OFFSHORE LOCATION

BACKGROUND

The present invention relates generally to wind turbines, and particularly to techniques for installing and anchoring foundations for offshore wind turbine systems. Advantageously, certain embodiments of the present technique may be employed to increase the water depth at which offshore wind turbines may be located.

Wind turbines are generally regarded as an environmentally safe and a desirable source of renewable energy. In summary, a wind turbine harnesses the kinetic energy of wind and transforms this kinetic energy into electrical energy. Thus, electrical power can be generated with virtually zero emissions, unlike existing natural gas-fired or coal-fired power generation technologies. To maximize the efficacy of power generation and to simplify connection to a power grid, several wind turbines are often located in proximity to one another in what are generally referred to in the pertinent art as "wind farms." Advantageously, these wind farms are located in regions having relatively strong winds, such as, for example, at offshore locations.

At offshore locations, in order to better access the prevailing winds around the year and to limit visibility from the shore, it is desirable to install wind farms at increasing distances from the shore, and consequently deeper water depths. Generally, for shallow water depths (for example, less than 20 meters), the typical foundation structure for an offshore wind turbine installation comprises a monopile. A monopile is essentially a long cylindrical caisson, assembled in sections on-shore and driven to the required soil penetration depth at the offshore installation site. However, for increasing water depths, a simple, traditional monopile foundation may prove uneconomical due to the correspondingly larger pile diameters and thicknesses that are required.

The overall structural design of the foundation structure of an offshore wind turbine is determined by the dynamic wind and wave loads under various turbine operational modes and by extreme loads imposed during high wind speed conditions and stormy sea states (during which the turbine is typically not operational). To minimize fatigue loading, the stiffness of the foundation structure should be desirably sized such that the overall natural frequency of the wind turbine/foundation system is outside the frequency range of excitation due to the rotor operation and the hydrodynamic wave loading. A typical industry practice is to size the stiffness of the foundation structure such that the overall system natural frequency is higher than the excitation from the rotor revolution but lower than the excitation from the blade passing the wind turbine tower. With this target natural frequency, the monopile diameters and thicknesses reach their current manufacturing limits for water depths between 20-25 meters (depending on the site conditions). At present, manufacturing capability is limited to fabricating monopiles of approximately 50 millimeters in thickness and 5.5 meters in diameter. Even if larger piles were to become available, the feasibility of such foundations is limited due to the limited availability and increasing expense of larger offshore pile driving hammers.

In the past, installation water depths greater than 20 meters have been contemplated by incorporating a tripod-style foundation structure. A typical tripod-style structure comprises, for example, 3-4 lateral braces that reinforce a central tubular column. These braces typically terminate in grouted sleeves, through which small diameter piles are driven to anchor the foundation and transmit the brace loads to the soil. As the braces of a tripod-style structure are rigidly attached to the central tower section, they have to be carefully designed to limit the stress concentration at these locations. In the past, the fatigue design of tripod joints and other welded connections in such structures have presented difficulty in design. In addition, the varying soil conditions and water depths in an offshore wind farm could result in varying brace diameters and joint geometries. In summary, the optimal tripod foundation structure is site specific and must be redesigned at each implementation. As a result, mass production of such tripod type structures may prove uneconomical.

Therefore, there is a need to design a foundation structure that will provide the necessary stiffness fatigue resistance and ease of geometric scalability at increased water depths. There is also a need for a more robust design of a foundation structure that is less sensitive to changes in water depth and underlying soil conditions.

BRIEF DESCRIPTION

Briefly, in accordance with one aspect of the present technique, a wind turbine system is provided. The wind turbine system includes a wind turbine generator having a rotor and a nacelle mounted atop a wind tower. The wind tower is mounted on a central caisson. The wind turbine system further includes a plurality of tensioned mooring lines secured to the central caisson. The mooring lines are further fixed to a plurality of anchors fixed on to a sea bed. These anchors are adapted to resist the varying tensile loads transmitted to it by the taut mooring lines.

In accordance with another aspect, a foundation structure for a superstructure is provided. The foundation structure includes a central caisson configured to support the superstructure. A plurality of tensioned mooring lines is flexibly secured to the central caisson. The foundation structure further includes a plurality of anchors fixed to a sea-bed. These anchors are adapted to support lateral loads on the foundation structure. Each of the plurality of tensioned mooring lines is further secured to an anchor.

In accordance with yet another aspect, a method of installing a wind turbine system is provided. The method involves securing a plurality of mooring lines to the central caisson. The plurality of mooring lines is secured to a plurality of anchors fixed to a sea-bed. The plurality of mooring lines is tensioned as required to ensure the overall structural stability of the wind turbine/foundation system. Finally the wind turbine tower is mounted upon the central caisson.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The technique described below provides a novel approach toward mounting a superstructure, such as a wind turbine tower, on a central pile or caisson at an offshore location, by incorporating taut or tensioned mooring lines. The overall lateral shear and overturning moment from the wind turbine are translated to varying tensile loads in the taut mooring lines. With varying water depths, the distance at which the mooring lines are anchored to the soil is increased in order to provide the required stiffness and the load carrying capacity. As the mooring lines are of a small diameter (approximately 3 to 5 inches), the resulting hydrodynamic loads on these lines are minimized and are essentially dominated by the wave loading on the central caisson. As will be appreciated, the present design is substantially independent of the depth of installation, and is relatively economical as in terms of material cost in comparison to using monopile/tripod foundation structures at deeper depths. Embodiments of the present technique are described hereinafter referring generally to FIG. 1-4.

Figure 1:
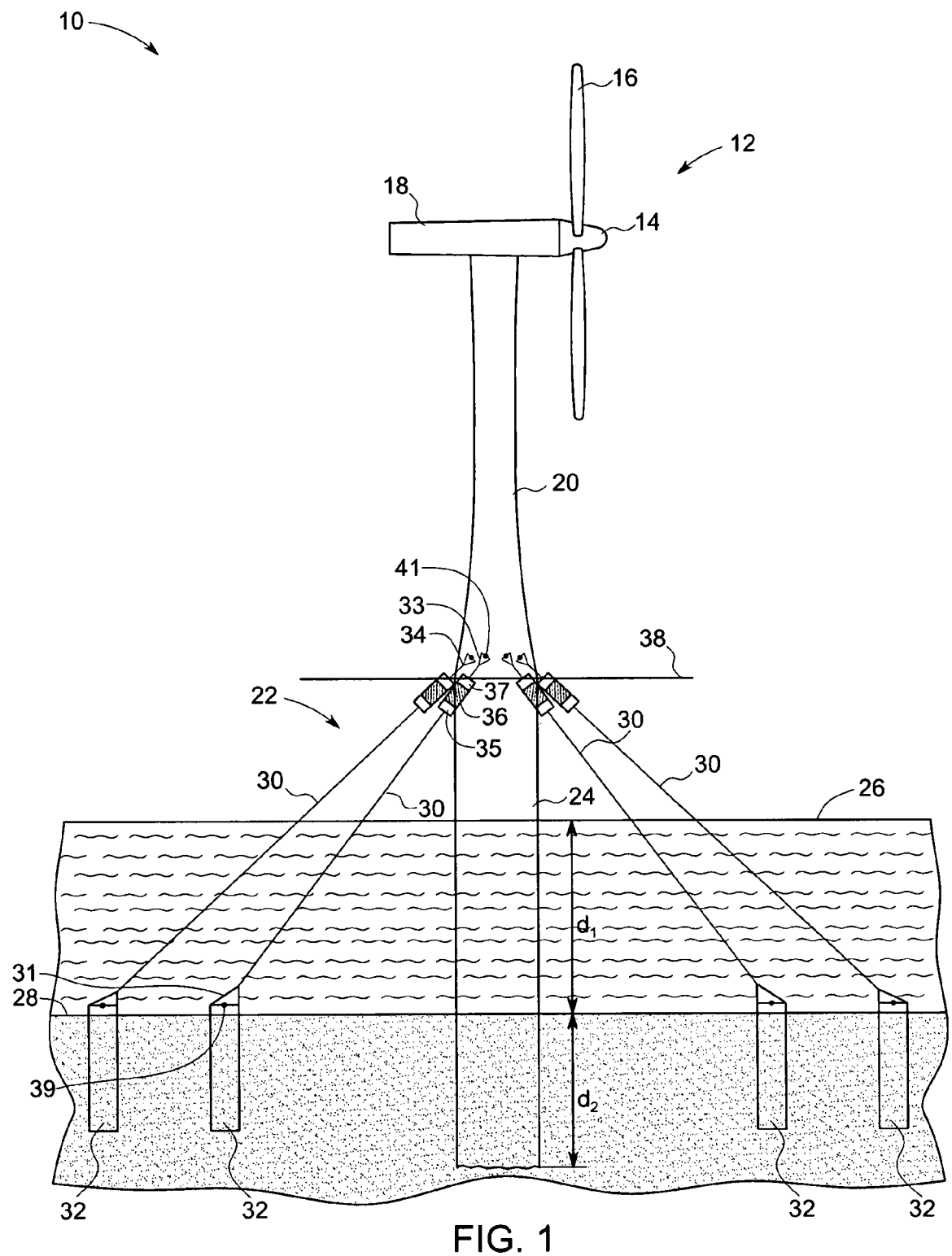
FIG. 1 is a diagrammatic illustration of an offshore wind turbine system, in accordance with one embodiment of the present technique.

Turning now to the drawings, FIG. 1 illustrates an offshore wind turbine system 10 in accordance with an exemplary embodiment of the present technique. The wind turbine system 10 includes a wind turbine generator 12 comprising a rotor 14 having multiple blades 16. Various electrical and mechanical components of the wind turbine generator 12, such as the drive train, electrical generator, etc are housed in a nacelle 18. The rotor 16 and the nacelle 18 are mounted atop a tower 20 that exposes the blades 16 to the wind. The blades 16 transform the kinetic energy of the wind into a rotation motion of a shaft that drives a generator (not shown) to produce electrical power.

The tower 20, the nacelle 18 and the rotor 14 are mounted on a foundation structure 22. In the illustrated embodiment, the foundation structure 22 includes a central caisson or pile 24 upon which the tower 20 is secured. The central caisson 24 is a cylindrical column, extending from the tower 20 to a depth '$d_1$' below a water level 26. The caisson 24 is driven into the soil to a depth '$d_2$' below a soil surface 28, also referred to as mud line. The caisson may be driven, for example 20-25 meters below the mud line 28. The central caisson 24 is configured to support the dead weight of the tower 20, nacelle 18 and rotor 14, axial (vertical direction) loads resulting due to the tension in the mooring lines (pre-tension during installation as well as the varying tensile loads during wind turbine operation) and overturning moments due to combined wind and wave loading. In accordance with one embodiment of the present technique, this combined lateral loading and overturning moment on the central caisson 24 is mitigated by the use of a plurality of taut or pre-tensioned cables 30, referred to as mooring lines. These pre-tensioned mooring lines 30 are configured to secure the wind turbine system 10 to the soil surface 28 via a array of depth anchors 32, also referred to as guide anchors. In one embodiment, these depth anchors 32 could be located in a symmetric circular array around the central caisson 24. In certain embodiments, the actual location of the depth anchors 32 may be determined based on the need to enhance the structural stiffness and load carrying capacity in certain directions. These depth anchors 32 may include small diameter (approximately 1-2 meters) pile foundations adapted to transfer the load from the tensioned mooring lines 30 to the soil. In certain embodiments, the depth anchors 32 may further include drag anchors embedded in the soil and adapted to support the tensile loads transmitted by the mooring lines 30.

The mooring lines 30 are flexibly connected at one end to the central caisson 24 and at an opposite end, to the anchors 34. In the context of this discussion, a "flexible" connection is one that permits relative rotation of the mooring lines 30 with respect to the central caisson 24 and the anchors 34 at the respective points of interconnection, thereby reducing fatigue and stress concentration at these joints. In effect, the "flexible" connections described in greater detail below are adapted to translate the lateral loads and overturning moments on the central caisson 24 into axial loads on the mooring lines 30. The mooring lines 30 may be formed, for example, from steel rope, synthetic polyester, among others and are typically between 3-5 inches in diameter. In the illustrated embodiment, the mooring lines 30 are designed with sockets 31 and 33 at either end. The illustrated sockets 31 and 33 are formed, for example, from cast steel pieces, and are of a conical shape with two parallel flanges which receives connecting pins 39 and 41. At the bottom end of the mooring line, the pin 39 perpendicular to line connects the bottom socket 31 to the depth anchor 32. At the other end, the pin 41 connects the top socket 33 to the caisson 24. The use of pinned connections allows for small rotations of the mooring line 30 and thereby minimizes the stress concentration at both junctions. Those skilled in the art will realize that several other commonly used mooring line termination designs can be while simultaneously minimizing the effect of stress concentrations. In one embodiment, the thickness of the central caisson 24 is increased near these junctions to increase the fatigue life and reliability of the design. In another embodiment, the plurality of mooring lines 30 terminate in a chain table assembly. The use of the chain table assembly allows for flexible connection and disconnection of the mooring lines 30 from the central caisson 24 during installation and maintenance periods as required. The chain table could be located either fully submerged (for aesthetic reasons) or be above the mean water level (for ease of maintenance). In another embodiment, multiple chain tables are utilized for securing the plurality of mooring lines 30 to the central caisson 24.

In the illustrated embodiment, each mooring line 30 includes an in-line tensioning device 36 to adjust the tension in the mooring line 30 and provide the appropriate lateral stability and foundation stiffness necessary at the installation site. Interconnections between the mooring line 30 and tensioning device 36 are through additional sockets 35 and 37, which may either be flanged or welded onto the tensioning device directly. In one embodiment, the tensioning device 36 consists of a threaded U-bolt with load nuts that can be tightened to increase tension in the mooring line 30. Various other in-line cable tensioning devices can be utilized as will be appreciated by those skilled in the art. The tensioning device 36 advantageously facilitates adjustments in the tension of the mooring lines to facilitate rapid installation of the foundation structure. In addition, the tension in the mooring lines 30 can be periodically adjusted to correct for effects of creep and relaxation and maintain an adequate margin of safety at all times.

The mooring lines 30 may be set to an initial pre-strain condition via the tensioning device 36 during installation of the wind turbine system 10. In certain embodiments, the tension in the mooring lines 30 may be relaxed during maintenance operations for easier access to site, and re-tensioned before the wind turbine resumes operation. The tensioned mooring lines 30 may further be advantageously used to secure the wind turbine nacelle/tower top prior to an extreme weather event such as a hurricane of wind/wave speeds outside of the initial design intent. In certain embodiments, redundant mooring lines may be used to anchor the caisson or tower such that the wind turbine remains operational in a stable regime when one of the mooring lines fails due to unforeseen events, such as, for example, ship impacts.

The point of interconnection of the mooring lines 30 and the tower/caisson may be as high as feasible on the particular site of installation based on navigational and aesthetic reasons, and also to maintain a safe distance with the passage of the rotating blades 16. In the illustrated embodiment, the mooring lines are interconnected at a deck level 38, which is typically 12-13 meters above the water level 26 to maintain an air gap during times of high tide and/or storm surge and waves. The tensioning devices 36 may be advantageously disposed at or above the water level 26 to facilitate easy and remote adjustment of the tension in the mooring lines 30 based on site conditions. In the illustrated embodiment the tensioning device 36 is positioned at the deck level 38. The taut mooring lines 30 may also be attached at other intermediate heights below the deck level 38 to provide necessary stability and stiffness required for stable operation of the wind turbine on the particular site of installation. In certain embodiments, additional submerged "clump weights" (not shown) may be attached to the mooring lines 30 between the depth anchor 32 and the tower 20 to provide means for adjusting the static and/or dynamic stiffness of the mooring configuration and controlling displacements of the tower 20.

Figure 2:
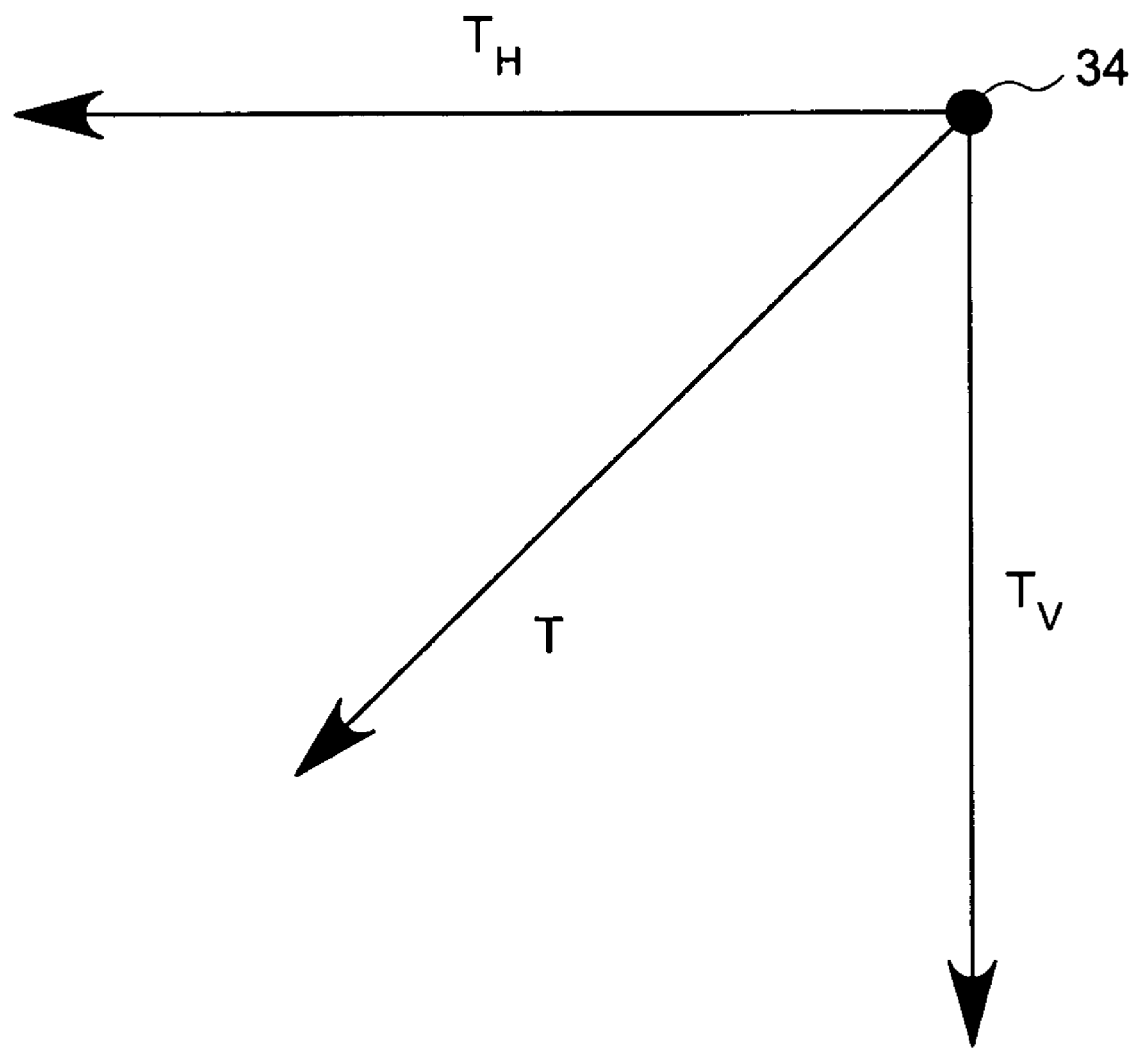
FIG. 2 illustrates a free body diagram of a pre-tensioned mooring line, in accordance with aspects of the present technique.

FIG. 2 illustrates a free body diagram of a tensioned mooring line 30 at a point 34 of interconnection with the central caisson (see FIG. 1). As illustrated, the tension T of the mooring line 30 may be resolved into a horizontal component $T_H$ and a vertical component $T_V$. The horizontal components $T_H$ of all the mooring lines sum up to produce a lateral load responsible for countering an overturning moment on the foundation structure 22. This overturning moment is supported by the array of depth anchors 32. However, the vertical components $T_V$ of each of the mooring lines sum to produce a net downward force on the caisson 30, which acts in the same direction as the dead weight of the tower, nacelle and the rotor. In certain embodiments, the total downward force on the caisson 30 due the tension in the mooring lines is of the same order as the dead weight of the tower, nacelle, and the rotor. The net downward force on the soil can be resisted by improving the bearing surface of the central caisson 30.

In one embodiment, the depth of penetration ($d_2$) of the central caisson 24 is increased such that the additional skin friction between the pile outer surface and soil is sufficient to provide improved bearing capacity. In another embodiment, the bottom of the central caisson 24 is driven to a certain penetration depth, the soil plug excavated and grouted with concrete to create a bearing surface that is substantially larger than just from the cylindrical caisson alone. In still another embodiment, the central caisson 24 is modified such that it incorporates a bearing plate near the bottom end 44 of the caisson (below the mud line 28) and is driven to the target penetration depth. The additional bearing surface area due to the bearing plate together with the skin friction provides the required bearing capacity.

Figure 3:
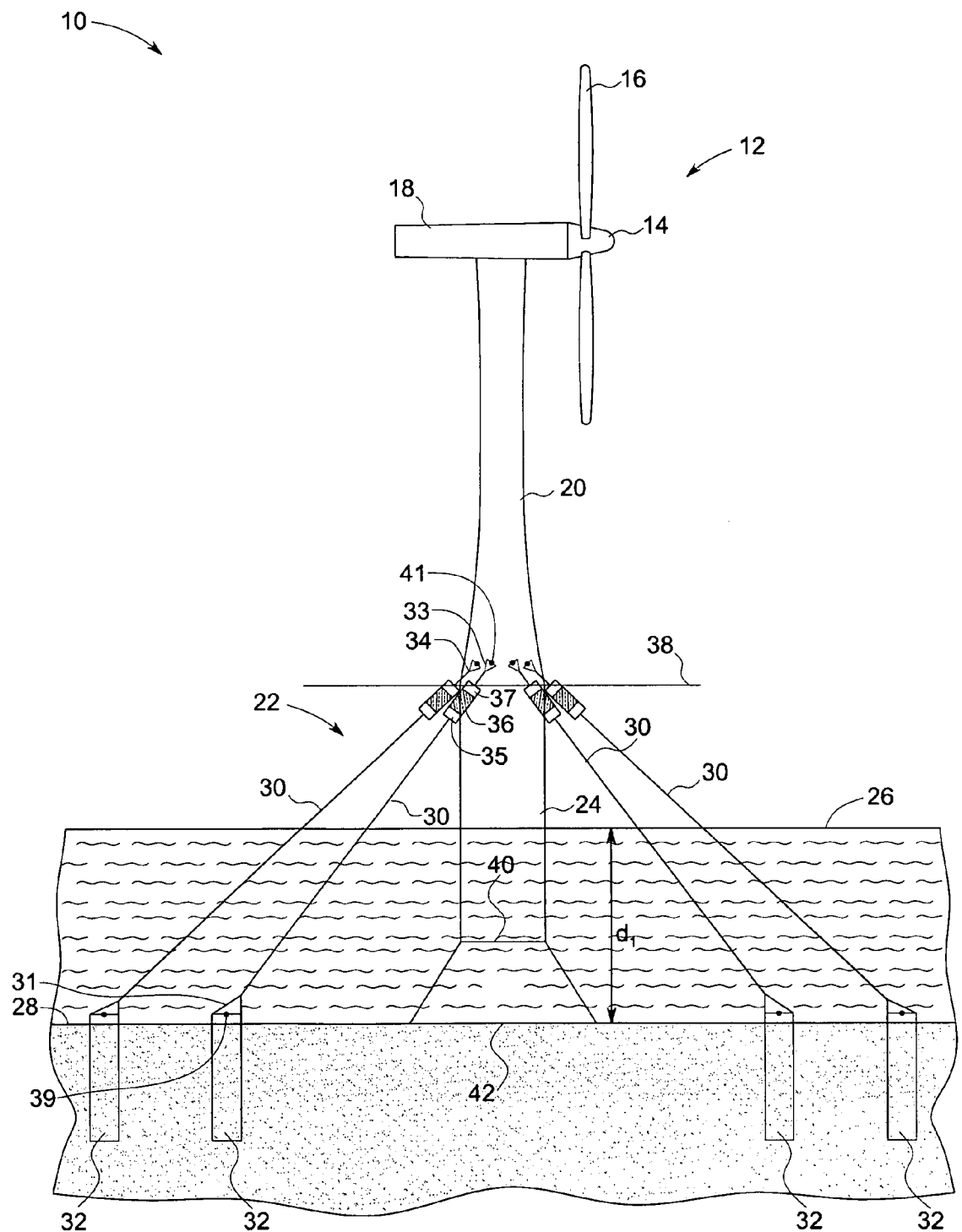
FIG. 3 is a diagrammatic illustration of a wind turbine system having a foundation structure incorporating a gravity-based system in accordance with aspects of the present technique.

FIG. 3 is a diagrammatic illustration of another embodiment in which the wind turbine system has a foundation structure incorporating a gravity-based system to transmit axial loads to the soil in accordance with aspects of the present technique. In the illustrated embodiment, instead of being driven through the soil, the caisson 24 is disposed at the sea-bed or mud line 28 over a gravity based system 40. The gravity-based system 40 is typically a large mass, for example 2-3 thousand tons and is adapted to transmit axial loads on the caisson 24 to the sea-bed. As discussed above, these axial loads are produced by the dead weight of the tower, rotor and nacelle, and the vertical load transmitted by the mooring lines 32. Lateral loads on the mooring lines 30 are borne by the depth anchors 32. Advantageously, the gravity-based system 40 may be formed from concrete, which is relatively inexpensive in comparison to steel. Further, installation of a gravity-based system is a relatively simple and less time consuming operation. In the illustrated embodiment, the gravity-based system 40 is configured as a conical frustum with increased surface toward the base. The above configuration advantageously provides an efficient bearing surface 42 to support increased axial loads.

In still different embodiments, the central caisson can be modified such that the large axial loads may be transmitted to the soil by suction anchors. In this embodiment, the depth of penetration to the soil is relatively small (5-10 meters) but the large bearing capacity of the suction anchor provides the necessary bearing capacity.

Figure 4:
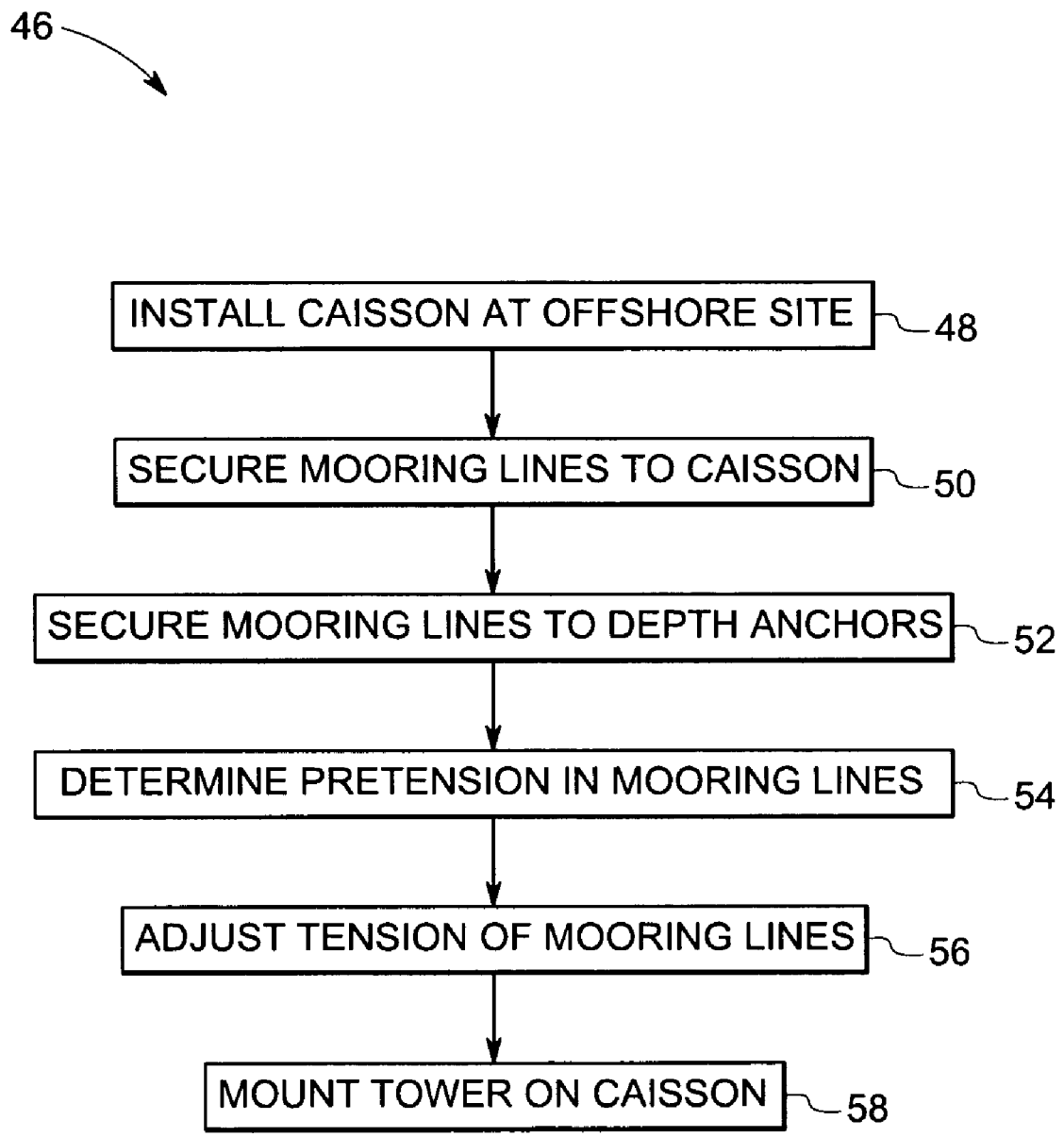
FIG. 4 is a flowchart illustrating an exemplary method of mounting a wind turbine system at an offshore location according to one embodiment technique.

FIG. 4 is a flowchart illustrating an exemplary method 46 for installing a wind turbine system at an offshore location according an aspect of the present technique. The method 46 begins at block 48 by installing a central caisson at the desired offshore location. Block 48 may include driving the central caisson below the soil surface, for example, by a hydraulic hammer. Alternately, as discussed above, block 48 may include disposing the caisson and the gravity based system at the sea-bed. At block 50, mooring lines or cables are secured to the central caisson. The mooring lines may be secured at the deck level as discussed above or may be secured at any intermediate height below the deck level to provide necessary lateral stability and stiffness required for stable operation of the wind turbine at that site. In certain embodiments, the mooring lines may be attached at various or multiple caisson heights to choose the appropriate mooring configuration based on the site conditions. At block 52, these mooring lines are secured to depth anchors, such as pile foundations or suction anchors are fixed to the sea-bed. At block 54, the required degree of pre-tension in the mooring lines is determined. This may be accomplished via numerical computation of the required tension to produce desired stiffness and stability based on site conditions. Alternately, the degree of pre-tension may be empirically determined based on historical data of offshore wind turbine installations. Next at block 56, the tensioning device is adjusted to produce a desired tension on the mooring lines as determined at block 52. Subsequently at block 58, the wind turbine tower is mounted on the central caisson.

The above described technique facilitates wind turbine installation at increased water depths (20-50 meters) at offshore locations. The design of the foundation structure in accordance with the present technique is largely independent of the depth of the installation, and is scaleable. Still further, the use of taut mooring lines involves much less material cost as compared to large monopile and tripod type foundation structures contemplated previously. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
   a wind turbine generator comprising a tower structure mounted on a central caisson;

a plurality of tensioned mooring lines flexibly secured to the central caisson; and a plurality of anchors fixed to a sea-bed and adapted to support lateral loads on the wind turbine system, wherein the each of the plurality of tensioned mooring lines is further secured to an anchor.

2. The wind turbine system of claim 1, wherein the tensioned mooring lines are secured to the central caisson at a deck level.

3. The wind turbine system of claim 1, further comprising a tensioning device configured to adjust tension of the mooring lines.

4. The wind turbine system of claim 3, wherein the tensioning device is positioned at a deck level.

5. The wind turbine system of claim 1, further comprising flexible pinned connections at points of interconnections of the mooring lines with the anchors and the central caisson, wherein the pinned-connections are configured to permit rotation of the mooring lines.

6. The wind turbine system of claim 5, wherein the pinned connections comprise flanged sockets adapted to receive a pin configured to secure the mooring lines at the points of interconnection.

7. The wind turbine system of claim 1, wherein the central caisson has increased thickness about points of interconnection with the mooring lines.

8. The wind turbine system of claim 3, wherein the tensioning device comprises a threaded U-shaped bolt and at least one nut configured for being tightened to adjust tension in the mooring lines.

9. The wind turbine system of claim 1, wherein the mooring lines comprise steel, or synthetic polyester, or combinations thereof.

10. The wind turbine system of claim 1, wherein the plurality of anchors comprises a plurality of pile foundations.

11. The wind turbine system of claim 1, wherein the plurality of anchors comprises a plurality of drag anchors.

12. The wind turbine system of claim 1, wherein the central caisson is configured for insertion into the sea-bed.

13. The wind turbine system of claim 1, wherein the central caisson is configured for being disposed over a gravity based system at the sea-bed.

14. The wind turbine system of claim 1, wherein the central caisson comprises a bearing plate toward a bottom end of the central caisson below a mud line.

15. The system of claim 1, wherein the central caisson comprises a cylindrical column extending from the tower structure to a depth "$d_1$" below a water level at the sea-bed.

16. The system of claim 15, wherein the cylindrical column further extends to a depth "$d_2$" below a mud line, wherein the mud line is located below the waterlevel at the sea-bed.

17. The system of claim 1, wherein the plurality of tension mooring lines are configured to secure the wind turbine system to a mud line, wherein the mud line is located below a water level at the sea-bed.

* * * * *